United States Patent [19]

Kumasaka et al.

[11] Patent Number: 4,814,515

[45] Date of Patent: Mar. 21, 1989

[54] METHOD OF MANUFACTURING A MODIFIED POLYHYDROXY COMPOUND

[75] Inventors: Sadao Kumasaka; Satomi Tada, both of Tokyo; Hirokazu Wakabayashi, Kawagoe, all of Japan

[73] Assignee: Human Industry Corporation, Tokyo, Japan

[21] Appl. No.: 52,222

[22] Filed: May 18, 1987

Related U.S. Application Data

[63] Continuation of Ser. No. 766,758, Aug. 16, 1985, abandoned.

[30] Foreign Application Priority Data

Aug. 24, 1984 [JP] Japan ................................ 59-176194

[51] Int. Cl.$^4$ ............................................. C07L 41/01
[52] U.S. Cl. .................................... 568/619; 568/620; 568/621; 568/613; 568/623; 568/624; 560/198; 560/200; 536/120
[58] Field of Search ............... 568/619, 620, 621, 613, 568/623, 624; 560/198, 200

[56] References Cited

U.S. PATENT DOCUMENTS 2,462,049  2/1949  Wyler .................................. 568/619
3,706,714  12/1972  Lloyd et al. .
4,251,636  2/1981  Zimmerman .

Primary Examiner—Howard T. Mars
Attorney, Agent, or Firm—Frishauf, Holtz, Goodman & Woodward

[57] ABSTRACT

A method of manufacturing a modified polyhydroxy compound, which is characterized in that a polyhydroxy compound is heated for 30 minutes or more at a temperature ranging from 150° to 250° C. under stirring and in the presence of tin, tin compounds such as tin halogenide, tin hydroxide and tin oxide. The polyhydroxy compound modified by this method is effective in improving the foamability and mechanical strength of urethane foam, when it is used as a raw material in the manufacture of urethane foam.

10 Claims, No Drawings

METHOD OF MANUFACTURING A MODIFIED POLYHYDROXY COMPOUND

This application is a continuation of application Ser. No. 766,758, filed Aug. 16, 1985, now abandoned.

BACKGROUND OF THE INVENTION a. Field of the Invention

The present invention relates to a method of improving properties of a polyhydroxy compound (e.g,. a polyether polyol or polyester polyol) as a raw material used in the manufacture of urethane foams.

b. Description of the Prior Art

Urethane foams are manufactured from an organic isocyanate compound, a polyhydroxy compound and water. An isocyanate component and a polyol component undergo a polymerization reaction to grow a urethane linkage. At the same time, the isocyanate component reacts with water in accordance with the reaction formula indicated below to generate carbon dioxide gas. The carbon dioxide gas forms a cell structure to provide a urethane foam.

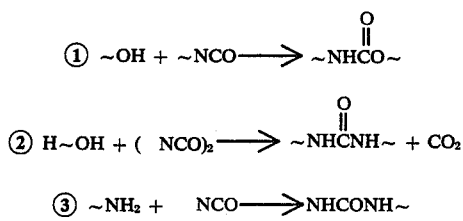

Conventionally, a polyether polyol or polyester polyol is widely used as a polyhydroxy compound for a raw material for manufacturing a urethane foam. In this case, reactivity in cell formation and specific gravity and hardness of the resultant urethane foam differ depending upon the polyol compound used. In general, primary polyol compounds (i.e., a starting material is addition-polymerized with propylene oxide and subsequently with ethylene oxide to produce a polyol) have higher reactivity than secondary polyol compounds (i.e., a starting material is addition-polymerized with propylene oxide without employing ethylene oxide to produce a polyol) and can produce urethane foams having smaller specific gravity and higher hardness. For these reasons, primary polyol compounds with higher reactivity are used for foaming in a mold, and secondary polyol compounds are used for manufacturing foam slabs by free foaming.

Thus, the properties of a polyhydroxy compound have a significant influence in foamability and product quality in the manufacture of urethane foams. Irrespective of this, no attempt has yet been made to modify polyhydroxy compounds.

SUMMARY OF THE INVENTION

The present invention has been made in consideration of this and has as its object to provide a method of manufacturing a modified polyhydroxy compound as one raw material so as to allow the manufacture of a urethane foam having a small specific gravity and a high hardness.

In order to achieve the above object of the present invention, there is provided a method of manufacturing a modified polyhydroxy compound characterized in that a polyhydroxy compound is heated for 30 minutes or more at a temperature within a range of 150° to 250° C. under stirring and in the presence of modifying agent comprising at least one member selected from the group consisting of tin halogenide, tin hydroxide, tin oxide and tin.

DETAILED DESCRIPTION OF THE PREFERRED EMBODIMENTS

Polyhydroxy compounds to be modified by the present invention are polyol compounds conventionally used in the manufacture of urethane foams and typically polyether polyols or polyester polyols. Polyether polyols are obtained by addition polymerization of epoxy compounds such as ethylene oxide or propylene oxide to a polyvalent alcohol. Examples of the polyalcohol as a starting material may include ethylene glycol, diethylene glycol, propylene glycol, butylene glycol, and hexylene glycol (2 functionality); glycerine, trimethylolpropane, trimethylolethane and 1,2,6-hexanetriol (3 functionality); pentaerythritol (4 functionality); and sorbitol, sucrose and the like. Polyol compounds to be modified may be primary or secondary polyols.

Tin to be used in the present invention may be in the form of an ingot, granule or a powder. As for tin compounds, i.e., tin halogenide, tin hydroxide, and tin oxide, although their forms are not particularly specified, they are generally used in a powder or granular form. A selected modifying agent is preferably added in the amount of one part by weight or more in the case of tin ingot, and 0.3 part by weight or more in the case of tin compounds, per 100 parts by weight of the polyol.

In order to practice the method of the present invention, a polyhydroxy compound is heated and stirred in the presence of metal tin or a tin compound. The heating temperature and time differ in accordance with the types of the polyhydroxy compound and tin compound used and the physical form of tin or the tin compound. However, generally, the heating temperature is 150° to 250° C., more preferably 190° to 220° C. and the heating time is 30 minutes to 3 hours. The modification effect is not improved even if heating is performed for a longer period of time.

When a urethane foam is manufactured using a polyhydroxy compound treated by the modifying method according to the present invention, a urethane foam is obtained having a smaller specific gravity and a higher hardness than in the case when a non-modified polyhydroxy compound is used. In addition, reactivity is improved, and better foamability is obtained. For these reasons, secondary polyol compounds which could not be conventionally used for foaming in a mold can be used as part of the raw material for foaming in a mold after being modified by the method of the present invention. In slab foaming, conventional low-density foams can have small specific gravity of up to only 0.013 g/cm$^3$. However, when polyols modified by the method of the present invention are used, ultra low-density foams having specific gravities of 0.008 to 0.012 g/cm$^3$ can be manufactured.

The mechanism of the modification effect obtained by the method of the present invention is not yet clarified. However, it is postulated that metal tin or a tin compound serves as a catalyst and the polyhydroxy compound undergoes a chemical change on the surface of the catalyst.

A modified polyol obtained herein can be used singly or in an a mixture of 2 or more depending upon the physical properties and the like of the objective product. Furthermore, a modified polyol according to the present invention can be blended with a non-modified polyol in a predetermined ratio.

EXAMPLE 1,000 g of a polyether polyol having a molecular weight of 3,000, a propylene oxide content of 100%, an OH value of 56, and a functionality of 3 were measured in a stainless steel container. Granules of tin ingot or a tin compound as in Table 1 below were charged in the container, and the mixture was heated under stirring at 150° to 250° C. for 2 hours. After the reaction, the mixture was cooled to provide a modified polyol.

TABLE 1

| Modified Polyol Sample | Tin | Tin Halogenide | Tin Hydroxide | Tin Oxide |
|---|---|---|---|---|
| No. 1 | 250 g | $SnCl_2$ = 5.0 g | | |
| No. 2 | 250 g | | $Sn(OH)_2$: 10 g | |
| No. 3 | 250 g | | | SnO: 30 g |
| No. 4 | 500 g | | | |

Foam Manufacture Test Example

The modified polyols obtained in the above Example (Sample Nos. 1 to 4) were used to manufacture soft polyurethane foams by the one-shot method. Each composition was adjusted to obtain a foam having a density of 0.010 or 0.016 g/cm$^3$. The physical properties of the obtained polyurethanes were examined.

As Control Tests, soft polyurethane foams were similarly manufactured using the same polyether polyols (having a molecular weight of 3,000, a propylene oxide content of 100%, and OH value of 56, and a functionality of 3) as above which were not however modified (Control Tests A and B).

The results obtained in the Tests and Control Tests are summarized in Table 2.

can be obtained according to the present invention. In addition, the soft polyurethane foams have better physical properties such as hardness than those of conventional foams even if they have lower density.

As described above, according to the present invention, a polyhydroxy compound as a raw material for the manufacture of a polyurethane foam is modified so that a polyurethane foam having a smaller specific gravity and a higher hardness can be manufactured.

What is claimed is:

1. A method of modifying a polyether polyol, which comprises a step of heating said polyether polyol at a temperature of from 150° to 250° C. with stirring and in the presence of tin as a modifying agent, for 30 minutes or more.

2. The method of claim 1, wherein a minor amount of a tin compound selected from the group consisting of tin halogenide, tin hydroxide and tin oxide is further added as part of the modifying agent comprising a predominant amount of tin.

3. The method of claim 2, wherein the tin to tin compound weight ratio is 250:5.

4. The method of claim 2, wherein the tin to tin compound weight ratio is 250:10.

5. The method of claim 2, wherein the tin to tin compound weight ratio is 250:30.

6. The method of claim 2, wherein the modifying agent consists essentially of tin.

7. The method of claim 1, wherein the modifying agent is in the form of tin granules or powder which are added in an amount of at least 1.0 part by weight per 100 parts by weight of the polyether polyol.

8. The method of claim 1 wherein the temperature is 190° to 220° C. and the heating time is 30 minutes to 3 hours.

9. The method of claim 8 wherein the temperature is 150° to 250° C.

10. The method of claim 9 wherein the time is 2 hours.

TABLE 2

| | Test 1 | Test 2 | Test 3 | Test 4 | Test 5 | Control Test A | Test 6 | Test 7 | Control Test B |
|---|---|---|---|---|---|---|---|---|---|
| Foaming Agent | | | | | | | | | |
| Modified polyol | 40 (sample No. 1) | 100 (sample No. 1) | 100 (sample No. 2) | 100 (sample No. 3) | 100 (sample No. 4) | — | 50 (sample No. 1) | 100 (sample No. 1) | — |
| Non-modified polyol | 60 | | | | | 100 | 50 | — | 100 |
| Triethylenediamine | 0.45 | 0.45 | 0.45 | 0.45 | 0.45 | 0.45 | 0.38 | 0.38 | 0.38 |
| n-Ethylmorpholine | 0.67 | 0.67 | 0.67 | 0.67 | 0.67 | 0.67 | 0.60 | 0.60 | 0.60 |
| Stannous octoate | 0.40 | 0.40 | 0.40 | 0.40 | 0.40 | 0.40 | 0.35 | 0.35 | 0.38 |
| Water | 7.0 | 7.0 | 7.0 | 7.0 | 7.0 | 6.5 | 5.3 | 5.3 | 5.3 |
| Silicone oil | 1.6 | 1.6 | 1.6 | 1.6 | 1.6 | 1.6 | 1.5 | 1.5 | 1.5 |
| Trichloro-fluoromethane | 8.0 | 8.0 | 8.0 | 8.0 | 8.0 | 8.0 | 8.0 | 8.0 | 8.0 |
| Methylene chloride | 8.0 | 8.0 | 8.0 | 8.0 | 8.0 | 8.0 | 4.0 | 4.0 | 4.0 |
| Tlylenediisocyanate | 78.0 | 78.0 | 78.0 | 78.0 | 78.0 | 78.0 | 68.0 | 68.0 | 68.0 |
| Physical Properties | | | | | | | | | |
| Density (g/cm$^3$) | 0.010 | 0.0098 | 0.010 | 0.010 | 0.0105 | 0.013 | 0.016 | 0.016 | 0.016 |
| Hardness (kg/JIS) | 7.3 | 7.8 | 7.5 | 7.8 | 7.1 | 6.0 | 9.6 | 10.2 | 8.3 |
| Tensile strength (kg/cm$^2$) | 0.70 | 0.65 | 0.65 | 0.65 | 0.66 | 0.65 | 0.85 | 0.85 | 0.83 |
| Elongation (%) | 150 | 145 | 145 | 140 | 150 | 155 | 175 | 170 | 170 |
| Tear strength | 0.41 | 0.37 | 0.40 | 0.40 | 0.42 | 0.35 | 0.50 | 0.45 | 0.45 |

As can be seen from the above results, low-density products which could not be obtained conventionally

* * * * *